US011990724B2

(12) United States Patent
Okoniewski et al.

(10) Patent No.: US 11,990,724 B2
(45) Date of Patent: *May 21, 2024

(54) APPARATUS AND METHODS FOR CONNECTING SECTIONS OF A COAXIAL LINE

(71) Applicant: Acceleware Ltd., Calgary (CA)

(72) Inventors: Michal M. Okoniewski, Calgary (CA); Lynn P. Tessier, Eckville (CA)

(73) Assignee: Acceleware Ltd., Calgary (CA)

( * ) Notice: Subject to any disclaimer, the term of this patent is extended or adjusted under 35 U.S.C. 154(b) by 1 day.

This patent is subject to a terminal disclaimer.

(21) Appl. No.: 17/683,831

(22) Filed: Mar. 1, 2022

(65) Prior Publication Data

US 2022/0247099 A1 Aug. 4, 2022

Related U.S. Application Data

(63) Continuation of application No. 17/258,382, filed as application No. PCT/CA2019/050900 on Jun. 28, 2019, now Pat. No. 11,296,434.

(Continued)

(51) Int. Cl.
*H01R 9/05* (2006.01)
*E21B 17/02* (2006.01)
(Continued)

(52) U.S. Cl.
CPC ......... *H01R 9/0503* (2013.01); *E21B 17/028* (2013.01); *E21B 17/042* (2013.01);
(Continued)

(58) Field of Classification Search
CPC ........ H01R 9/0503; H01R 43/26; H01R 4/56; E21B 17/028; E21B 17/042;
(Continued)

(56) References Cited

U.S. PATENT DOCUMENTS

| | | | |
|---|---|---|---|
| 2,035,274 A | 3/1936 | Mougey | |
| 2,556,244 A | 6/1951 | Weston | |

(Continued)

FOREIGN PATENT DOCUMENTS

| | | |
|---|---|---|
| CA | 2346546 C | 11/2004 |
| CA | 2609762 A1 | 12/2006 |

(Continued)

OTHER PUBLICATIONS

International Search Report and Written Opinion mailed Aug. 21, 2019 in corresponding International Patent Application No. PCT/CA2019/050900. (9 pages).

*Primary Examiner* — Andrea Lindgren Baltzell
*Assistant Examiner* — Kimberly E Glenn
(74) *Attorney, Agent, or Firm* — BERESKIN & PARR LLP/S.E.N.C.R.L. s.r.l; Isis E. Caulder; Maria Wei

(57) ABSTRACT

An apparatus for a coaxial transmission line is provided. The apparatus can include a first and a second section of a conductor of the coaxial transmission line and a connector for connecting the first and the second sections in end-to-end relation. Each of the first and the second sections of the conductor have an exterior lateral surface and an interior lateral surface. For inner conductors, the connector is connected to the interior lateral surfaces of the first and second sections of the conductor. For outer conductors, the connector is connected to the exterior lateral surfaces of the first and second sections of the conductor. The connector allows the inner and outer diameters of the annulus between the inner and outer conductors line to be substantially uniform along the length of the coaxial transmission line.

24 Claims, 6 Drawing Sheets

Related U.S. Application Data

(60) Provisional application No. 62/695,335, filed on Jul. 9, 2018.

(51) Int. Cl.
*E21B 17/042* (2006.01)
*E21B 17/10* (2006.01)
*H01P 3/06* (2006.01)
*H01Q 1/04* (2006.01)
*H01R 43/26* (2006.01)
*H05B 6/62* (2006.01)
*E21B 43/24* (2006.01)

(52) U.S. Cl.
CPC ............ *E21B 17/1078* (2013.01); *H01P 3/06* (2013.01); *H01R 43/26* (2013.01); *H05B 6/62* (2013.01); *E21B 43/2401* (2013.01); *H01Q 1/04* (2013.01); *H05B 2214/03* (2013.01)

(58) Field of Classification Search
CPC .. E21B 17/1078; E21B 43/2401; E21B 43/24; H01P 3/06; H05B 6/62; H05B 2214/03; H01Q 1/04; H01Q 13/08
See application file for complete search history.

(56) References Cited

U.S. PATENT DOCUMENTS

| | | | |
|---|---|---|---|
| 2,757,738 A | | 8/1956 | Ritchey |
| 3,126,438 A | | 3/1964 | Lorrin |
| 3,188,587 A | | 6/1965 | Huber et al. |
| 3,227,800 A | | 1/1966 | Bondon |
| 3,249,901 A | | 5/1966 | Spinner |
| 3,271,506 A | | 9/1966 | Martin et al. |
| 3,286,015 A | | 11/1966 | Hildebrand et al. |
| 3,356,785 A | | 12/1967 | Yoshida et al. |
| 3,514,523 A | | 5/1970 | Hildebrand et al. |
| 3,748,373 A | | 7/1973 | Remy |
| 3,750,058 A | | 7/1973 | Bankert, Jr. et al. |
| 3,758,700 A | | 9/1973 | Ditscheid |
| 3,813,481 A | | 5/1974 | Adams |
| 3,931,451 A | | 1/1976 | Durschner et al. |
| 4,018,977 A | | 4/1977 | Herrmann, Jr. et al. |
| 4,092,485 A | | 5/1978 | Wanser |
| 4,132,855 A | | 1/1979 | Clark et al. |
| 4,135,579 A | | 1/1979 | Rowland et al. |
| 4,140,179 A | | 2/1979 | Kasevich et al. |
| 4,140,180 A | | 2/1979 | Bridges et al. |
| 4,144,935 A | | 3/1979 | Bridges et al. |
| 4,145,565 A | | 3/1979 | Donon |
| 4,193,451 A | | 3/1980 | Dauphine |
| 4,247,136 A | | 1/1981 | Fouss et al. |
| 4,281,209 A | | 7/1981 | Yoshioka et al. |
| 4,301,865 A | | 11/1981 | Kasevich et al. |
| 4,319,632 A | | 3/1982 | Marr, Jr. |
| 4,320,801 A | | 3/1982 | Rowland et al. |
| 4,449,585 A | | 5/1984 | Bridges et al. |
| 4,470,459 A | | 9/1984 | Copland |
| 4,487,257 A | | 12/1984 | Dauphine |
| 4,508,168 A | | 4/1985 | Hereen |
| 4,513,815 A | | 4/1985 | Rundell et al. |
| 4,554,399 A | | 11/1985 | Cookson |
| 4,629,222 A | | 12/1986 | Dearden et al. |
| 4,705,914 A | | 11/1987 | Bondon |
| 4,927,189 A | | 5/1990 | Burkit |
| 5,262,593 A | | 11/1993 | Madry et al. |
| 5,467,420 A | | 11/1995 | Rohrmann et al. |
| 5,742,002 A | | 4/1998 | Arredondo et al. |
| 6,022,054 A | * | 2/2000 | Hemphill ............ B29C 66/1142 285/915 |
| 6,189,611 B1 | | 2/2001 | Kasevich |
| 6,246,006 B1 | | 6/2001 | Hardin et al. |
| 6,346,671 B1 | | 2/2002 | Ahrens et al. |
| 6,712,644 B1 | | 3/2004 | Decormier |
| 6,956,164 B2 | | 10/2005 | Brown |
| 7,674,981 B1 | | 3/2010 | Hesselbarth et al. |
| 7,891,421 B2 | | 2/2011 | Kasevich |
| 7,897,874 B2 | | 3/2011 | Park et al. |
| 8,453,739 B2 | | 6/2013 | Parsche |
| 8,519,268 B2 | | 8/2013 | Leipold et al. |
| 8,648,760 B2 | | 2/2014 | Parsche |
| 8,763,691 B2 | | 7/2014 | Parsche |
| 8,789,599 B2 | | 7/2014 | Parsche |
| 8,796,552 B2 | | 8/2014 | Faulkner et al. |
| 8,847,711 B2 | | 9/2014 | Wright et al. |
| 9,151,146 B2 | | 10/2015 | Rey-Bethbeder et al. |
| 9,377,553 B2 | | 6/2016 | Wright et al. |
| 9,765,606 B2 | | 9/2017 | Snow et al. |
| 2009/0178827 A1 | | 7/2009 | Mahlandt et al. |
| 2011/0042063 A1 | | 2/2011 | Diehl et al. |
| 2011/0146981 A1 | | 6/2011 | Diehl |
| 2011/0303423 A1 | | 12/2011 | Kaminsky et al. |
| 2012/0067580 A1 | | 3/2012 | Parsche |
| 2012/0118565 A1 | | 5/2012 | Trautman et al. |
| 2013/0192825 A1 | | 8/2013 | Parsche |
| 2014/0131032 A1 | | 5/2014 | Dittmer |
| 2014/0284102 A1 | | 9/2014 | Ichikawa et al. |
| 2014/0290934 A1 | | 10/2014 | Parsche |
| 2014/0345904 A1 | | 11/2014 | Nagahashi |
| 2015/0070112 A1 | | 3/2015 | Wright et al. |
| 2015/0276113 A1 | | 10/2015 | Bass et al. |
| 2016/0047213 A1 | | 2/2016 | Grounds, III et al. |
| 2016/0356136 A1 | | 12/2016 | Whitney et al. |
| 2021/0005352 A1 | | 1/2021 | Okoniewski et al. |

FOREIGN PATENT DOCUMENTS

| | | | |
|---|---|---|---|
| CA | 2816101 | A1 | 5/2012 |
| CA | 2895595 | A1 | 12/2015 |
| CA | 2816297 | C | 5/2017 |
| EP | 1779938 | A2 | 5/2007 |
| JP | 2015100188 | A | 5/2015 |
| WO | 2012/067769 | A2 | 5/2012 |
| WO | 2017/177319 | A1 | 10/2017 |

* cited by examiner

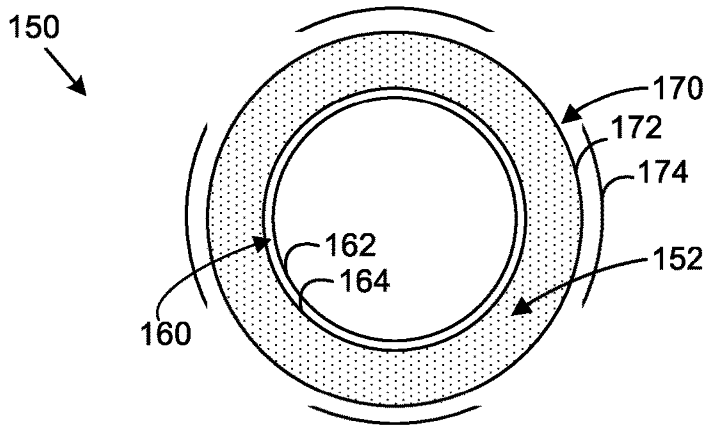
FIG. 2A
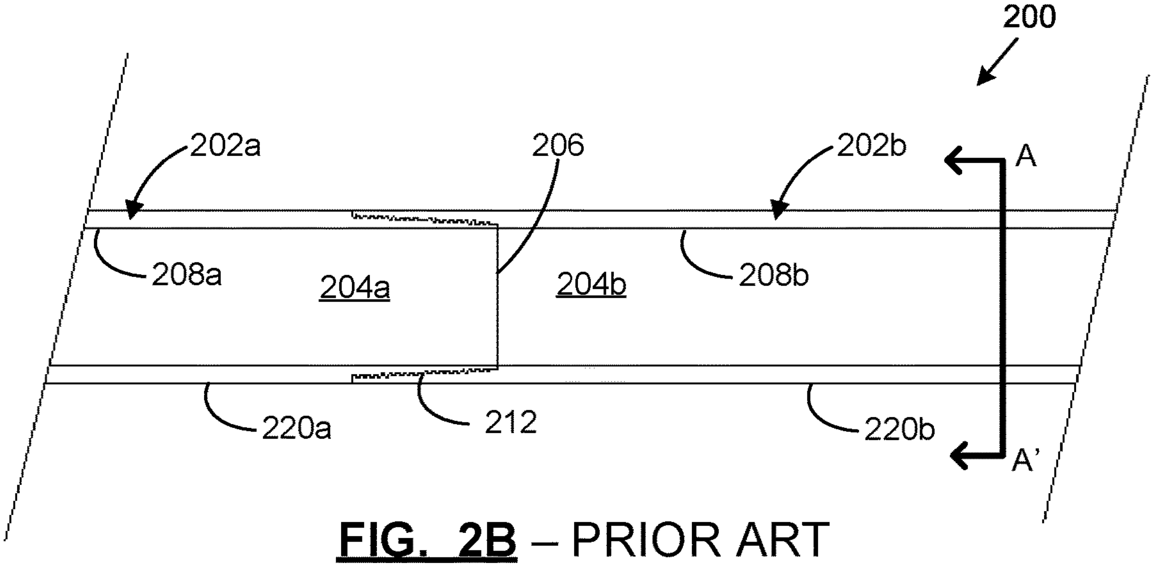
FIG. 2B – PRIOR ART
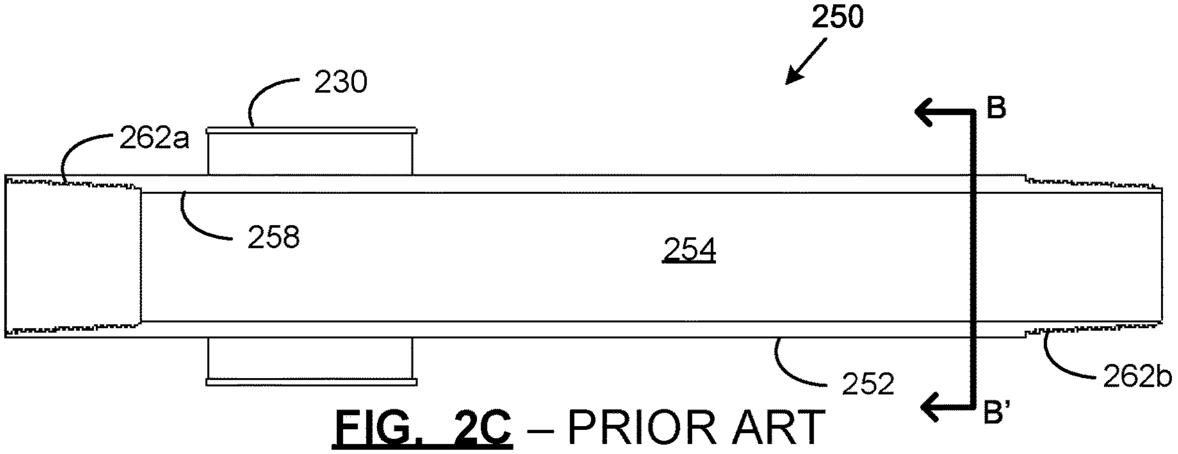
FIG. 2C – PRIOR ART

APPARATUS AND METHODS FOR CONNECTING SECTIONS OF A COAXIAL LINE

CROSS-REFERENCE TO RELATED APPLICATIONS

This application is a continuation of U.S. patent application Ser. No. 17/258,382 filed on Jan. 6, 2021, which claims priority to International Application No. PCT/CA2019/050900 filed on Jun. 28, 2019, which claims the benefit of U.S. Provisional Patent Application No. 62/695,335 filed on Jul. 9, 2018. The complete disclosures of U.S. application Ser. No. 17/258,382, Int. App. No. PCT/CA2019/050900, and U.S. App. No. 62/695,335 are hereby incorporated by reference for all purposes.

FIELD

The embodiments described herein relate to electromagnetically heating hydrocarbon formations, and in particular to apparatus and methods of connecting sections of coaxial transmission lines for systems that electromagnetically heat hydrocarbon formations.

BACKGROUND

Electromagnetic (EM) heating can be used for enhanced recovery of hydrocarbons from underground reservoirs. Similar to traditional steam-based technologies, the application of EM energy to heat hydrocarbon formations can reduce viscosity and mobilize bitumen and heavy oil within the hydrocarbon formation for production. Hydrocarbon formations can include heavy oil formations, oil sands, tar sands, carbonate formations, shale oil formations, and any other hydrocarbon bearing formations, or any other mineral.

EM heating of hydrocarbon formations can be achieved by using an EM radiator, or antenna, applicator, or lossy transmission line positioned inside an underground reservoir to radiate, or couple, EM energy to the hydrocarbon formation. To carry EM power from a radio frequency (RF) generator to the antenna, transmission lines capable of delivering high EM power over long distances is required. Furthermore, such transmission lines must be capable of withstanding harsh environments (e.g., such as high pressure and temperature) usually found within underground oil wells.

To transmit RF signals or power, the most common transmission line is a coaxial transmission line. Coaxial transmission lines are commercially-available, and capable of delivering power or signals over long distances. Coaxial transmission lines are well-known in applications including communications, radar, electronic and industrial applications. These applications however involve delivering low or medium power in environments having lower pressure and temperature than those usually found within underground oil wells. For high power transmission at ultra-high frequencies (UHF) or microwaves, other options such as rectangular or circular waveguides are available. These options are often impractical at lower frequencies, since at lower frequencies, rectangular and circular waveguides are generally too physically large to be used, a particularly critical feature when transmitting RF power underground.

The use of coaxial transmission lines in special environments, including aerospace and oil and gas (such as EM heating of underground hydrocarbon formations), can present various challenges that require additional design and materials.

First, transmission lines that are deployed in underground wells have limited cross-sectional diameters. Second, underground oil wells can be warm or hot, and typically, their natural cooling mechanisms (e.g., air circulation around the surface cables) are not available. Third, transmission lines can be deployed in harsh environments, including high pressure and high temperature (e.g., changing with depth, and varying with time) and may be exposed to a variety of fluids and/or chemicals (e.g., requirements for corrosion resistance).

In addition, transmission lines must withstand mechanical stresses of deployment and construction and site assembly. Also, because of the limited cross-sectional diameters of underground oil wells and the need for high power, a cable must be able to handle high voltages. That is, the dielectric breakdown of the material(s) forming the cable must be taken into consideration. Additionally, large currents can lead to excessive heating, particularly from the inner conductor of the coaxial transmission line, where the surface current densities are the greatest, which also needs to be taken into consideration.

Furthermore, inner conductors of the coaxial transmission line need to be supported by centralizers that, beyond their centralizing function, must facilitate deployment, and possibly transfer heat from the inner conductor to the outer conductor. Furthermore, because of the high-energy density of the transmission line, and high values of electric fields, arcing prevention needs to be considered.

SUMMARY

The various embodiments described herein generally relate to apparatus (and associated methods to provide the apparatus) for coaxial transmission lines. Coaxial transmission lines have an outer conductor surrounding an inner conductor along a longitudinal axis of the inner conductor. The apparatus can include a first section and at least a second section of an inner conductor of the coaxial transmission line and at least one connector for connecting the first section and the second section in end-to-end relation. Each of the first section and the second section of the inner conductor have an exterior lateral surface and an interior lateral surface and is formed of a conductive material. The exterior lateral surface of the first section defines a substantially uniform first outer diameter along the length of the first section. The interior lateral surface of the first section has a first threaded portion located at a first end of the first section. The exterior lateral surface of the second section also defines a substantially uniform second outer diameter along the length of the second section. The second outer diameter is substantially equal to the first outer diameter. The interior lateral surface of the second section has a second threaded portion located at a second end of the second section. The connector has an exterior lateral surface extending between two opposed ends. The exterior lateral surface of the connector has a third threaded portion at a first of the two opposed ends for threadably engaging the first threaded portion of the first section and a fourth threaded portion at a second of the two opposed ends for threadably engaging the second threaded portion of the second section.

In at least one embodiment, the interior lateral surface of the first section can have a first non-threaded portion. The first non-threaded portion can define a substantially uniform first inner diameter along the length of the first non-threaded portion. The first threaded portion can be recessed from the first non-threaded portion. The interior lateral surface of the second section having a second non-threaded portion. The second non-threaded portion can define a substantially uniform second inner diameter along the length of the second non-threaded portion. The second inner diameter can be substantially equal to the first inner diameter. The second threaded portion can be recessed from the second non-threaded portion. The connector can have an interior lateral surface defining a connector inner diameter that is substantially equal to or less than the first inner diameter.

In at least one embodiment, the connector can be formed of conductive material to provide an electrical connection between the first section and the second section of the inner conductor.

In at least one embodiment, the connector includes a middle portion between the third threaded portion and the fourth threaded portion. The exterior lateral surface along the middle portion can define a substantially uniform third outer diameter.

In at least one embodiment, the third outer diameter can be substantially equal to the first outer diameter.

In at least one embodiment, the connector further includes a centralizer provided on the middle portion for coaxially positioning the inner conductor within an outer conductor. The centralizer can be integral to the connector.

In at least one embedment, the third outer diameter is less than the first outer diameter, and the connector further includes a centralizer mounted on a ring member. The ring member can have a thickness defined by an internal lateral surface and an external lateral surface. The external lateral surface of the ring member can define a substantially uniform fourth outer diameter that is substantially equal to the first outer diameter. The internal lateral surface can be slidably mounted on the middle portion of the inner connector.

In at least one embodiment, the end faces of the first end and the second end can be complementary to each other to provide an electrical connection between the first section and the second section of the inner conductor.

In at least one embodiment, either the exterior lateral surface of the connector or the interior lateral surfaces of the first section and the second section can be hardened.

In at least one embodiment, the hardening of either the exterior lateral surface of the connector or the interior lateral surfaces of the first section and the second section can be provided by at least one of the group including: a heat treatment, a hard coating, or a material forming the exterior lateral surface having a hardness that is greater than a hardness of a material forming the first threaded portion and the second threaded portion.

In at least one embodiment, the material of the exterior lateral surface can include at least one of the group comprising: beryllium, rhodium, ruthenium, copper, aluminum, and silver.

In at least one embodiment, the exterior lateral surface of the connector can be substantially parallel to a longitudinal axis of the connector.

In at least one embodiment, the exterior lateral surface of the connector can be tapered at the two opposed ends with respect to a longitudinal axis of the connector.

In at least one embodiment, the connector can have a tubular shape.

In at least one embodiment, at least one of the connector, the first section, and the second section further include a non-magnetic liner to reduce eddy current losses on the first section and the second section.

In at least one embodiment, when a non-magnetic liner is provided on the connector, the non-magnetic liner is located on the exterior lateral surface of the connector. In at least one embodiment, when a non-magnetic liner is provided on the first section, the non-magnetic liner is located on at least one of the first threaded portion of the first section and the exterior lateral surface of the first section. In at least one embodiment, when a non-magnetic liner is provided on the second section, the non-magnetic liner is located on at least one of the second threaded portion of the second section and the exterior lateral surface of the second section.

In at least one embodiment, the non-magnetic liner is formed of at least one of the group including aluminum, bronze, stainless steel, brass, copper, silver, non-magnetic metals, and alloys.

In another broad aspect, the apparatus can include a first section and at least a second section of an outer conductor of the coaxial transmission line and at least one connector for connecting the first section and the second section in end-to-end relation. Each of the first section and the second section of the inner conductor have an exterior lateral surface and an interior lateral surface and is formed of a conductive material. The interior lateral surface of the first section can define a substantially uniform first inner diameter along the length of the first section. The exterior lateral surface can have a first threaded portion and a first non-threaded portion. The first non-threaded portion can define a substantially uniform first outer diameter along the length of the first non-threaded portion. The first threaded portion can be located at a first end of the first section and recessed from the first non-threaded portion. The interior lateral surface of the second section can define a substantially uniform second inner diameter along the length of the second section. The second inner diameter can be substantially equal to the first inner diameter. The exterior lateral surface can have a second threaded portion and a second non-threaded portion. The second non-threaded portion can define a substantially uniform second outer diameter along the length of the second non-threaded portion. The second outer diameter can be substantially equal to the first outer diameter. The second threaded portion can be located at a second end of the second section and recessed from the second non-threaded portion. The connector can have an interior lateral surface extending from a first end and a second end opposed to the first end. The interior lateral surface of the connector can have a third threaded portion at the first end for threadably engaging the first threaded portion of the first section and a fourth threaded portion at the second end for threadably engaging the second threaded portion of the second section. The connector can have an exterior lateral surface defining a connector outer diameter that is substantially equal to or less than the first outer diameter.

In at least one embodiment, the connector can be formed of conductive material to provide an electrical connection between the first section and the second section of the inner conductor.

In at least one embodiment, the end faces of the first end and the second end can be complementary to each other to provide an electrical connection between the first section and the second section of the outer conductor.

In at least one embodiment, either the interior lateral surface of the connector or the exterior lateral surfaces of the first section and the second section can be hardened.

In at least one embodiment, the hardening of either the interior lateral surface of the connector or the exterior lateral surfaces of the first section and the second section can be provided by at least one of the group including: a heat treatment, a hard coating, or a material forming the interior lateral surface having a hardness that is greater than a hardness of a material forming the first threaded portion and the second threaded portion.

In at least one embodiment, the material of the interior lateral surface can include at least one of the group comprising: beryllium, rhodium, ruthenium, copper, aluminum, and silver.

In at least one embodiment, the interior lateral surface of the connector can be substantially parallel to a longitudinal axis of the connector.

In at least one embodiment, the interior lateral surface of the connector can be tapered at the two opposed ends with respect to a longitudinal axis of the connector.

In at least one embodiment, the connector can have a tubular shape.

In at least one embodiment, at least one of the connector, the first section, and the second section further include a non-magnetic liner to reduce eddy current losses on the first section and the second section.

In at least one embodiment, when a non-magnetic liner is provided on the connector, the non-magnetic liner is located on the interior lateral surface of the connector. In at least one embodiment, when a non-magnetic liner is provided on the first section, the non-magnetic liner is located on at least one of the first threaded portion of the first section and the interior lateral surface of the first section. In at least one embodiment, when a non-magnetic liner is provided on the second section, the non-magnetic liner is located on at least one of the second threaded portion of the second section and the interior lateral surface of the second section.

In at least one embodiment, the non-magnetic liner is formed of at least one of the group including aluminum, bronze, stainless steel, brass, copper, silver, non-magnetic metals, and alloys.

In another broad aspect, a method of providing a coaxial transmission line is described. A coaxial transmission line can have an outer conductor surrounding an inner conductor along a longitudinal axis of the inner conductor. An annulus can be formed between the inner conductor and outer conductor. The method can involve providing a first section of a first conductor of the coaxial transmission line having a first threaded portion at a first end; and attaching a first connector to the first section. The first connector can have a lateral surface extending between two opposed ends. The lateral surface of the first connector can have a third threaded portion at a first of the two opposed ends and a fourth threaded portion at a second of the two opposed ends. The third threaded portion of the first connector can engage with the first threaded portion of the first section. The method also involves attaching a second section of the first conductor to the first connector. The second section can have a second threaded portion at a first end. The second threaded portion of the second section can engage with the fourth threaded portion of the first connector. The method also involves providing a second conductor of the coaxial transmission line; and arranging the first conductor and the second conductor coaxially to form the annulus between the first conductor and the second conductor. Either the inner diameter or the outer diameter of the annulus that is defined by the first conductor is substantially uniform along the length of the first section and the second section of the first conductor.

In at least one embodiment, the method can further involve hardening either the lateral surface of the first connector or the first threaded portion of the first section and the second threaded portion of the second section of the first conductor prior to attaching the first connector to the first section.

In at least one embodiment, the hardening of either the lateral surface of the first connector or the first threaded portion of the first section of the first conductor can involve at least one of the group including: heat treating the lateral surface of the first connector, coating the lateral surface of the first connector, or forming the lateral surface of the first connector using a material having a hardness that is greater than a hardness of a material forming the first threaded portion and the second threaded portion of the first conductor.

In at least one embodiment, the providing the second conductor of the coaxial transmission line can involve providing a first section of a second conductor having a first threaded portion at a first end and attaching a second connector to the first section of the second conductor. The second connector can have a lateral surface extending between two opposed ends. The lateral surface can have a third threaded portion at a first of the two opposed ends and a fourth threaded portion at a second of the two opposed ends. The third threaded portion of the second connector can engage with the first threaded portion of the first section of the second conductor. The method can also involve attaching a second section of the second conductor to the second connector. The second section of the second conductor can have a second threaded portion at a first end. The second threaded portion of the second conductor can engage with the fourth threaded portion of the second connector Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 2A is a cross-sectional view at a point along a longitudinal axis of a coaxial transmission line;

FIG. 2B is a cross-sectional, longitudinal view of a portion of a conductor of a coaxial transmission line formed by a plurality of conventional joints connected in end-to-end relation with a flush-joint type connections;

FIG. 2C is a cross-sectional, longitudinal view of a joint with an integral centralizer mounted on the joint;

Figure 1:
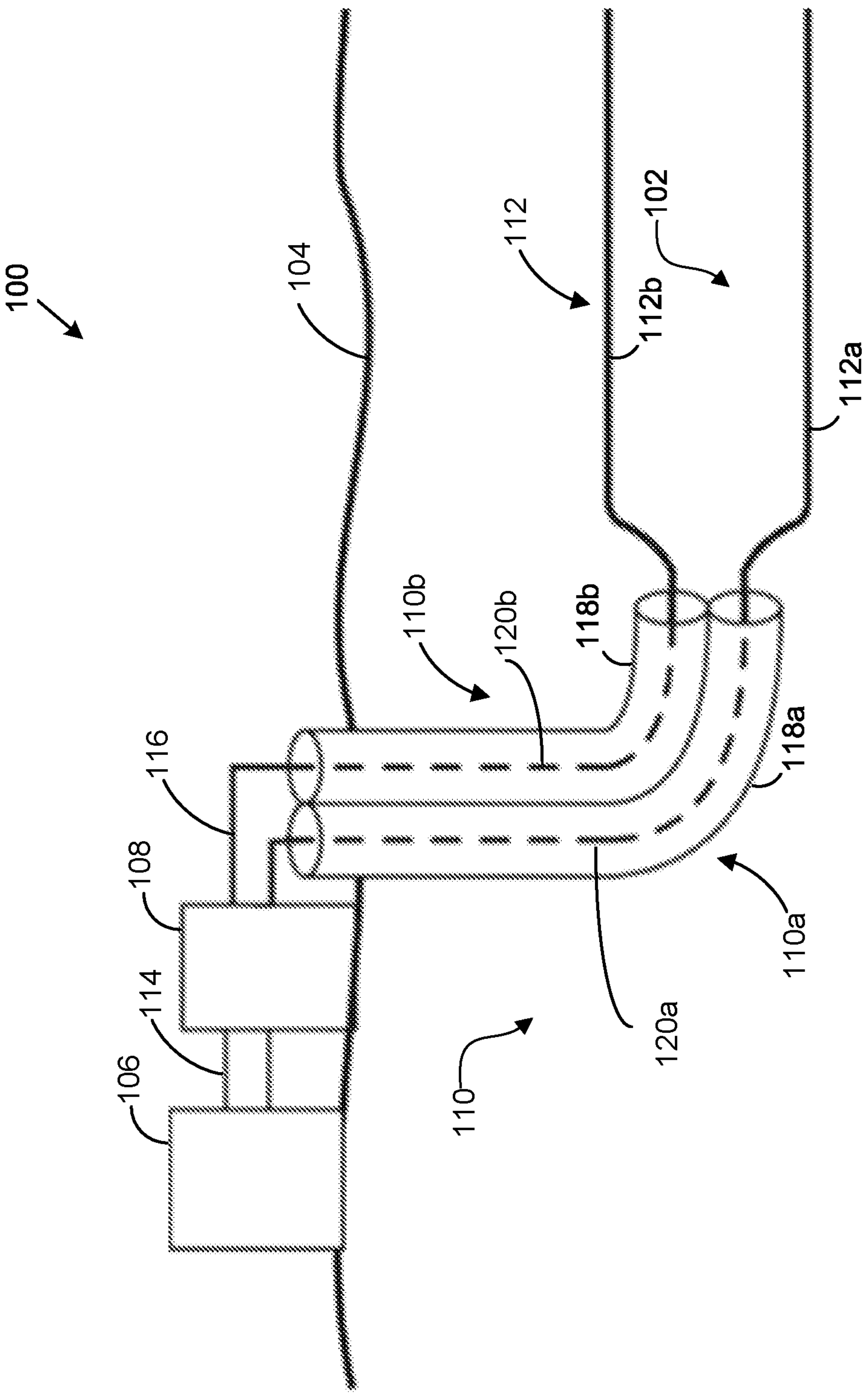
FIG. 1 is profile view of an apparatus for electromagnetic heating of formations according to at least one embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

It should be noted that phase shifts or phase differences between time-harmonic (e.g. a single frequency sinusoidal) signals can be expressed herein as a time delay. For time harmonic signals, time delay and phase difference convey the same physical effect. For example, a 180° phase difference between two time-harmonic signals of the same frequency can also be referred to as a half-period delay. As a further example, a 90° phase difference can also be referred to as a quarter-period delay. A time delay is typically a more general concept for comparing periodic signals. For instance, if periodic signals contain multiple frequencies (e.g. a series of rectangular or triangular pulses), then the time lag between two such periodic signals having the same fundamental harmonic is referred to as a time delay. For simplicity, in the case of single frequency sinusoidal signals, the term "phase shift" is generally used herein. In the case of multi-frequency periodic signals, the term "phase shift" used herein generally refers to the time delay equal to the corresponding time delay of the fundamental harmonic of the two signals.

The expression substantially identical is considered here to mean sharing the same waveform shape, frequency, amplitude, and being synchronized.

The expression phase-shifted version is considered here to mean sharing the same waveform, shape, frequency, and amplitude but not being synchronized. In some embodiments, the phase-shift may be a 180° phase shift. In some embodiments, the phase-shift may be an arbitrary phase shift so as to produce an arbitrary phase difference.

The term radio frequency when used herein is intended to extend beyond the conventional meaning of radio frequency. The term radio frequency is considered here to include frequencies at which physical dimensions of system components are comparable to the wavelength of the EM wave. System components that are less than approximately 10 wavelengths in length can be considered comparable to the wavelength. For example, a 1 kilometer (km) long underground system that uses EM energy to heat underground formations and operates at 50 kilohertz (kHz) will have physical dimensions that are comparable to the wavelength. If the underground formation has significant water content, (e.g., relative electrical permittivity being approximately 60 and conductivity being approximately 0.002 S/m), the EM wavelength at 50 kHz is 303 meters. The length of the 1 km long radiator is approximately 3.3 wavelengths. If the underground formation is dry (e.g., relative electrical permittivity being approximately 6 and conductivity being approximately 3E-7 S/m), the EM wavelength at 50 kHz is 2450 meters. The length of the radiator is then approximately 0.4 wavelengths. Therefore in both wet and dry scenarios, the length of the radiator is comparable to the wavelength. Accordingly, effects typically seen in conventional RF systems will be present and while 50 kHz is not typically considered RF frequency, this system is considered to be an RF system.

Referring to FIG. 1, shown therein is a profile view of an apparatus 100 for electromagnetic heating of hydrocarbon formations according to at least one embodiment. The apparatus 100 can be used for electromagnetic heating of a hydrocarbon formation 102. The apparatus 100 includes an electrical power source 106, an electromagnetic (EM) wave generator 108, a waveguide portion 110, and transmission line conductor portion 112. As shown in FIG. 1, the electrical power source 106 and the electromagnetic wave generator 108 can be located at the surface 104. In at least one embodiment, any one or both of the electrical power source 106 and the electromagnetic wave generator 108 can be located below ground.

The electrical power source 106 generates electrical power. The electrical power source 106 can be any appropriate source of electrical power, such as a stand-alone electric generator or an electrical grid. The electrical power may be one of alternating current (AC) or direct current (DC). Power cables 114 carry the electrical power from the electrical power source 106 to the EM wave generator 108.

The EM wave generator 108 generates EM power. It will be understood that EM power can be high frequency alternating current, alternating voltage, current waves, or voltage waves. The EM power can be a periodic high frequency signal having a fundamental frequency ($f_0$). The high frequency signal can have a sinusoidal waveform, square waveform, or any other appropriate shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 108 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

As noted above, in some embodiments, the EM wave generator 108 can be located underground. An apparatus with the EM wave generator 108 located above ground rather than underground can be easier to deploy. However, when the EM wave generator 108 is located underground, transmission losses are reduced because EM energy is not dissipated in the areas that do not produce hydrocarbons (i.e., distance between the EM wave generator 108 and the transmission line conductor portion 112).

The waveguide portion 110 can carry high frequency alternating current from the EM wave generator 108 to the transmission line conductors 112*a* and 112*b*. Each of the transmission line conductors 112*a* and 112*b* can be coupled to the EM wave generator 108 via individual waveguides 110*a* and 110*b*. As shown in FIG. 1, the waveguides 110*a* and 110*b* can be collectively referred to as the waveguide portion 110. Each of the waveguides 110*a* and 110*b* can have a proximal end and a distal end. The proximal ends of the waveguides can be connected to the EM wave generator 108. The distal ends of the waveguides 110*a* and 110*b* can be connected to the transmission line conductors 112*a* and 112*b*.

Each waveguide 110*a* and 110*b* can be provided by a coaxial transmission line having an outer conductor 118*a* and 118*b* and an inner conductor 120*a* and 120*b*, respectively. In some embodiments, each of the waveguides 110*a* and 110*b* can be provided by a metal casing pipe as the outer conductor and the metal casings concentrically surrounding pipes, cables, wires, or conductor rods, as the inner conductors. In some embodiments, the outer conductors 118*a* and 118*b* can be positioned within at least one additional casing pipe along at least part of the length of the waveguide portion 110.

The transmission line conductor portion 112 can be coupled to the EM wave generator 108 via the waveguide portion 110. As shown in FIG. 1, the transmission line conductors 112*a* and 112*b* may be collectively referred to as the transmission line conductor portion 112. According to some embodiments, additional transmission line conductors 112 may be included.

Each of the transmission line conductors 112*a* and 112*b* can be defined by a pipe. In some embodiments, the apparatus may include more than two transmission line conductors. In some embodiments, only one or none of the transmission line conductors may be defined by a pipe. In some embodiments, the transmission line conductors 112*a* and 112*b* may be conductor rods, coiled tubing, or coaxial cables, or any other pipe to transmit EM energy from EM wave generator 108.

The transmission line conductors 112*a* and 112*b* have a proximal end and a distal end. The proximal end of the transmission line conductors 112*a* and 112*b* can be coupled to the EM wave generator 108, via the waveguide portion 110. The transmission line conductors 112*a* and 112*b* can be excited by the high frequency alternating current generated by the EM wave generator 108. When excited, the transmission line conductors 112*a* and 112*b* can form an open transmission line between transmission line conductors 112*a* and 112*b*. The open transmission line can carry EM energy in a cross-section of a radius comparable to a wavelength of the excitation. The open transmission line can propagate an EM wave from the proximal end of the transmission line conductors 112*a* and 112*b* to the distal end of the transmission line conductors 112*a* and 112*b*. In at least one embodiment, the EM wave may propagate as a standing wave. In at least one other embodiment, the electromagnetic wave may propagate as a partially standing wave. In yet at least one other embodiment, the electromagnetic wave may propagate as a travelling wave.

The hydrocarbon formation 102 between the transmission line conductors 112*a* and 112*b* can act as a dielectric medium for the open transmission line. The open transmission line can carry and dissipate energy within the dielectric medium, that is, the hydrocarbon formation 102. The open transmission line formed by transmission line conductors and carrying EM energy within the hydrocarbon formation 102 can be considered a "dynamic transmission line". By propagating an EM wave from the proximal end of the transmission line conductors 112*a* and 112*b* to the distal end of the transmission line conductors 112*a* and 112*b*, the dynamic transmission line can carry EM energy within long well bores. Well bores spanning a length of 500 meters (m) to 1500 meters (m) can be considered long.

FIG. 1 is provided for illustration purposes only and other configurations are possible. For example, only two transmission line conductors are shown in FIG. 1 as forming a dynamic transmission line; however, any number of additional transmission line conductors can be added.

Referring to FIG. 2A, shown therein is a cross-sectional view at a point along a longitudinal axis of a coaxial transmission line 150. The coaxial transmission line 150 has an inner conductor 160 surrounded by an outer conductor 170, forming an annulus 152 between the inner conductor 160 and the outer conductor 170.

FIG. 2A is provided for illustration purposes only and other configurations are possible. For example, in FIG. 2A, the inner conductor 160 and the outer conductor 170 are shown as being concentric. In some cases, centralizers can be provided in the annulus 152 to provide concentric arrangement between the inner conductor 160 and the outer conductor 170. In another example, the inner conductor 160 and the outer conductor 170 may not be concentric.

The inner conductor 160 has an interior lateral surface 162 and an exterior lateral surface 164. The exterior lateral surface 164 of the inner conductor 160 is proximal to the outer conductor 170. The interior lateral surface 162 defines an inner circumference with an inner diameter of the inner conductor 160. The exterior lateral surface 164 defines an outer circumference with an outer diameter of the inner conductor 160.

The outer conductor 170 has an interior lateral surface 172 and an exterior lateral surface 174. The interior lateral surface 172 of the outer conductor 170 is proximal to the inner conductor 160. The interior lateral surface 172 defines an inner circumference with an inner diameter of the outer conductor 170. The exterior lateral surface 174 defines an outer circumference with an outer diameter of the outer conductor 170.

The annulus 152 is a region defined by the exterior lateral surface 164, that is, the outer diameter of the inner conductor 160 and the interior lateral surface 172, that is, the inner diameter of the outer conductor 170. It is desirable for the annulus 152 between the inner conductor 160 and outer conductor 170 to be substantially uniform along the length of the coaxial transmission line 150. Changes in the exterior lateral surface 164 of the inner conductor 160 or the interior lateral surface of the outer conductor 170 along the length of the coaxial transmission line 150 can lead to field concentration effects, changes in the characteristic impedance of the coaxial transmission line, and formation of reactances or wave reflections, potential shorting, and arcing in high power applications.

In addition, the installation of some centralizers can involve sliding the centralizer along the exterior lateral surface 164 of the inner conductor 160 or inserting the inner conductor 160 with the centralizer mounted thereon inside the outer conductor 170. In such cases, bumps or ridges on the exterior lateral surface 164 of the inner conductor and the interior lateral surface 172 of the outer conductor 170 can be interfere with the sliding the centralizer along the inner conductor 160 or inserting the inner conductor 160 in the outer conductor 170.

In addition, a non-uniform exterior lateral surface 174, that is, changes in the outer diameter of the outer conductor 170 can impede deployment. For example, portions of the outer conductor 170 having a larger outer diameter can catch or become stacked or become hung up when running the outer conductor 170 down the well hole. As well, when a second outer conductor 118*b* is deployed beside the first outer conductor 118*a*, portions of the outer conductors 118*a*, 118*b* having a larger outer diameter can catch, stack, or hang up on each other and prevent the second outer conductor 118*b* from being deployed.

Referring to FIG. 2B, shown therein is a cross-sectional, longitudinal view of a portion of a conductor 200 of a coaxial transmission line formed by a plurality of conventional lengths of tubing (herein after referred to as joints) 202*a*, 202*b* connected in end-to-end relation with flush joint type connections. The conductor 200 can be an inner conductor 160 or an outer conductor 170 of a coaxial transmission line 150. That is, a cross-section of the conductor 200 along the longitudinal axis, indicated by A-A', can correspond to the inner conductor 160 or the outer conductor 170 of the coaxial transmission line 150 of FIG. 2A.

Each of the joints 202*a*, 202*b* form a section of the conductor 200. Each of the joints 202*a*, 202*b* have an exterior lateral surface 220*a*, 220*b* and an interior lateral surface 208*a*, 208*b* defining bores 204*a*, 204*b*. The exterior lateral surface 220*a*, 220*b* defines an outer circumference with an outer diameter. The interior lateral surface 208*a*, 208*b* defines an inner circumference with an inner diameter. Each of the outer diameter and the inner diameter are shown in FIG. 2B as being substantially uniform along the length of the joints 202*a*, 202*b*.

Conventional joints 202*a*, 202*b* have complementary ends to engage with other joints. As shown in FIG. 2B, joints 202*a*, 202*b* have tapered threaded portions 212 to connect together. Joints 202*a*, 202*b* are in physical contact at interface 206 to form an electrical connection between sections of the conductor 200.

The outer diameter and inner diameter of the joints along the length of the joints are herein referred to as the nominal outer diameter and the nominal inner diameter of the joints 202*a*, 202*b*, respectively. The connection shown at the threaded portions 212 can be characterized as being flush because the outer diameter and the inner diameter of the conductor 200 at the threaded portion 212, are substantially the same as the nominal outer diameter and nominal inner diameter of the joints 202*a*, 202*b*, respectively.

When the joints are thin wall joints (not shown), a nominal thickness of the joints, that is, the difference between the nominal inner diameter and the nominal outer diameter may be too thin to provide tapered threading. In order to provide threading at each end of the joints, the threaded portion may be thicker than the nominal thickness of the joints. That is, the interior lateral surface at the threaded portion may protrude inwards, reducing the bore, or the exterior lateral surface at the threaded portion may protrude outward.

Referring to FIG. 2C, shown therein is a cross-sectional, longitudinal view of a joint 250 with an integral centralizer 230 mounted on the joint 250. With an integral centralizer 130 mounted on the joint 250, joint 250 can form a section of the inner conductor 150 of the coaxial transmission line 150 of FIG. 2A. That is, a cross-section of the joint 250 along the longitudinal axis, indicated by B-B', can correspond to the inner conductor 150 of the coaxial transmission line 150 of FIG. 2A.

Similar to joint 202*a*, 202*b*, joint 250 has an exterior lateral surface 252 and an interior lateral surface 258 defining bore 254. The joint 250 has a tapered threaded portion 262*a* on the interior lateral surface 258 at a first end and a tapered threaded portion 262*b* on the exterior lateral surface 252 at a second end. As can be seen in FIG. 2B, at 212, a tapered threaded portion on the interior lateral surface 208 of joint 202*b* receives a tapered threaded portion on the exterior lateral surface 220 of joint 202*b*.

Referring to FIG. 2B, the conductor 200 including joints 202*a*, 202*b* can be made of any appropriate conductive material, including but not limited to aluminum, copper, various conductive alloys, or it can be made of other metals cladded with conductive material. In some cases, threaded portions 212, 262*a*, 262*b* can be plated, or electrodeposited with materials including but not limited to alloys, pure platinum group metals, palladium, ruthenium, tin, silver, and other metals.

Threaded portions 212, 262*a*, 262*b* made of aluminum can gall and seize, making it difficult to connect joints 202*a*, 202*b* together. Furthermore, disconnecting joints 202*a*, 202*b* often damages the threading and the joints 202*a*, 202*b* cannot be connected again. Thread compounds can be applied to the threaded portions 212, 262*a*, 262*b* to reduce but not eliminate the potential for galling and seizing. Furthermore, thread compounds can introduce particulate contaminates in the coaxial transmission line, which increases the risk of shorting and increases electrical losses.

Tapered threaded portions can be advantageous because stress is distributed over a larger area, providing a stronger connection. As well, tapered threaded portions can engage completely, allowing for a liquid tight connection. However, with tapered threaded portions 212, 262*a*, 262*b*, a high axial tolerance is required in order to ensure physical contact between the joints 202*a*, 202*b*. Such high axial tolerance can be too wide and difficult to achieve at the recommended make up torque of the joints 202*a*, 202*b*. When the joints 202*a*, 202*b* are not in contact with the high axial tolerance, the electrical connection between sections of the conductor 200 can be unreliable. While higher precision threading can achieve the high axial tolerance, the cost of higher precision threading can be prohibitive.

Figure 3:
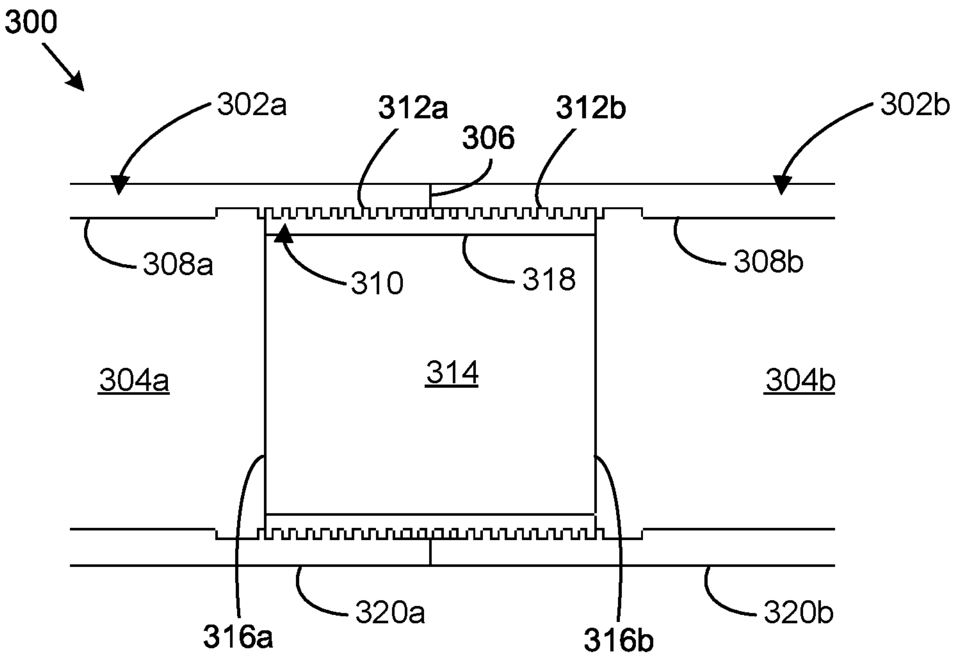
FIG. 3 is a cross-sectional, longitudinal view of a portion of an inner conductor of a coaxial transmission line, in accordance with at least one embodiment.

Referring now to FIG. 3, shown therein is a cross-sectional, longitudinal view of a portion of an inner conductor of a coaxial transmission line, in accordance with at least one embodiment. The inner conductor 300 is formed of a plurality of sections 302*a*, 302*b* connected in end-to-end relation. Two adjacent sections 302*a*, 302*b* are connected together by an inner coupling or an inner connector 310. While only two sections of the inner conductor of a coaxial transmission line has been shown in FIG. 3, it is understood that the inner conductor can include more than two sections. Additional sections of the inner conductor can also be connected by additional inner connectors 310.

In some embodiments, each of the sections 302*a*, 302*b* of the inner conductor 300 can be provided by a joint, that is, a length of tubing, such as a tubing joint or a pup joint. The sections 302*a*, 302*b* have complementary shaped end faces to engage with other sections. As shown in FIG. 3, both sections 302*a*, 302*b* have substantially planar shaped end faces that are substantially orthogonal to the longitudinal axis at interface 306. Sections 302*a*, 302*b* are in physical contact with one another at the interface 306 to form an electrical connection. End faces with other geometries are possible. For example, the end faces can be angled with respect to the longitudinal axis and/or include groves and protrusions. Such geometries can increase the surface area of the interface 306 at which the end faces engage with one another, thereby reducing the electrical resistance of the sections 302*a*, 302*b*.

Each of the sections 302*a*, 302*b* have an exterior lateral surface 320*a*, 320*b* and an interior lateral surface 308*a*, 308*b* forming bores 304*a*, 304*b*. The exterior lateral surfaces 320*a*, 320*b* define an outer circumference with an outer diameter that is substantially uniform along the length of the sections 302*a*, 302*b*, or the nominal outer diameter. As shown in FIG. 3, the exterior lateral surface of the inner conductor 300 is provided by the exterior lateral surface 320*a*, 320*b* of the sections, which are substantially equal. Thus, the outer diameter of the inner conductor 300 is substantially uniform along the length of the coaxial transmission line, reducing field concentration effects, potential shorting, and changes in the characteristic impedance of the coaxial transmission line.

The interior lateral surfaces 308*a*, 308*b* provide non-threaded portions and threaded portions 312*a*, 312*b*. The threaded portions 312*a*, 312*b* can engage with the inner connector 310. The non-threaded portions of the interior lateral surfaces 308*a*, 308*b* define an inner circumference with an inner diameter that is substantially uniform along the length of the sections 302*a*, 302*b*, or the nominal inner diameter.

The inner connector 310 extends between two opposed ends 316*a*, 316*b*, defining a longitudinal axis. The inner connector 310 has an exterior lateral surface that extends between the two opposed ends 316*a*, 316*b*. The exterior lateral surface of the inner connector 310 provides a first threaded portion and a second threaded portion. The first threaded portion of the inner connector 310 can engage with a complementary threaded portion 312*a* of a first section of the inner conductor 300, such as section 302*a* and the second threaded portion can engage with a complementary threaded portion 312*b* of a second section of the inner conductor 300, such as section 302*b*.

By providing an inner connector 310 to connect adjacent sections 302*a*, 302*b*, the nominal thickness of the sections 302*a*, 302*b* at the threaded portions do not need to be increased. In particular, the exterior lateral surface at the threaded portions 312*a*, 312*b* do not protrude outwards and the inner diameter of the annulus 152 can be substantially uniform along the length of the coaxial transmission line 150.

As shown in FIG. 3, the inner connector 310 can have a tubular shape. That is, the inner connector 310 can have an interior lateral surface 318 that also extends between the two opposed ends 316*a*, 316*b*. The interior lateral surface 318 of the inner connector 310 defines bore 314 along the longitudinal axis. The interior lateral surface 318 defines an inner circumference with an inner diameter that is substantially uniform along the length of the inner connector 310.

In some embodiments, the inner diameter of the inner connector 310 can be substantially equal to the nominal inner diameter of the sections 302*a*, 302*b* to provide an inner conductor 300 with a substantially uniform inner diameter along the length of the inner conductor 300. In such embodiments, the threaded portions 312*a*, 312*b* of the sections 302*a*, 302*b* are recessed from the non-threaded portions of the sections 302*a*, 302*b*.

However, fluids may be carried in the bores 304*a*, 304*b*, 314 of the inner conductor 300 to provide cooling of the inner conductor 300. In such cases, it can be desirable for the inner diameter of the threaded portions 312*a*, 312*b* of the sections 302*a*, 302*b* to be smaller than the inner diameter of the non-threaded portion of the sections 302*a*, 302*b*. If fluids are carried in the bores 304*a*, 304*b*, 314 of the inner conductor 300, it is desirable for the inner diameter of the inner connector 310 to be substantially uniform along the length of the inner conductor 300.

Similar to joints 202*a*, 202*b*, sections 302*a*, 302*b* can be made of any appropriate conductive material, including but not limited to aluminum, copper, various conductive alloys, or it can be made of other metals cladded with conductive material.

The inner connector 310 can be made of a material having a hardness that is significantly greater than the hardness of the sections 302*a*, 302*b* to reduce the risk of galling and seizing when connected with the sections 302*a*, 302*b*. For example, the inner connector 310 can be formed of steel, particularly when the sections 302*a*, 302*b* are formed of aluminum.

In addition, the inner connector 310 is formed of conductive material to provide a reliable electrical connection between the first section and the second section of the inner conductor.

The threaded portions 312*a*, 312*b* of the sections 302*a*, 302*b* and the inner connector 310 are substantially parallel to the longitudinal axis of the inner conductor 300. Threaded portions that are substantially parallel to the longitudinal axis of the inner conductor 300 require less axial tolerance to ensure physical contact than that required for tapered threaded portions 212, 262*a*, 262*b*. Thus, threading that is substantially parallel to the longitudinal axis of the inner conductor 300 can provide a more reliable electrical connection between the sections 302*a*, 302*b*.

In some embodiments, the exterior lateral surface of the inner connector 310, that is, the threaded portion can be hardened to reduce the risk of galling and seizing when the inner connector 310 is connected to the sections 302*a*, 302*b*. In other embodiments, the threaded portions 312*a*, 312*b* of the sections 302*a*, 302*b* can be hardened to reduce the risk of galling and seizing when the inner connector 310 is connected to the sections 302*a*, 302*b*. It should be noted that the threaded portions of either the inner connector 310 or the sections 302*a*, 302*b* can be threaded, but not both because a difference in hardness is required to avoid galling and seizing. Hardening can be provided by a heat treatment, a hard coating, or a material forming the exterior lateral surface of the inner connector 310 having a hardness that is greater than a hardness of a material forming the threaded portions 312*a*, 312*b* of the sections 302*a*, 302*b*. Examples of material having a high hardness include, but is not limited to, beryllium, rhodium, ruthenium, and/or alloys containing same or containing copper, aluminum, and silver. It can be preferable to harden the threaded portion of the inner connector 310 instead of the sections 302*a*, 302*b* because the physical dimensions of the sections 302*a*, 302*b* can require special equipment, such as large ovens for heat treatment.

In some embodiments, the inner connector 310 and/or the sections 302*a*, 302*b* can include a non-magnetic liner to reduce eddy current losses on the sections 302*a*, 302*b*. The non-magnetic liner can be located on the exterior lateral surface of the inner connector 310, the exterior lateral surface 320*a*, 320*b* of the sections 302*a*, 302*b*, and/or the threaded portions 312*a*, 312*b* of the sections 302*a*, 302*b*. Examples of non-magnetic liners include, but is not limited to, aluminum, bronze, stainless steel, brass, copper, silver, non-magnetic metals, and alloys.

The complementary threaded portions 312*a*, 312*b* of the sections 302*a*, 302*b* and the inner connector 310 can be any engagement means to attach or mount the sections 302*a*, 302*b* to the inner connector 310. When threading is provided, the threading can be stub ACME threads, American Petroleum Institute (API) round threads, or any other form of threading. Other engagement means for attaching sections to a connector are possible. However, it can be preferable for the engagement means to be a form that is already used within the industry. The possibility of installation error may be greater if installation personnel are unfamiliar with the engagement means.

Figure 4:
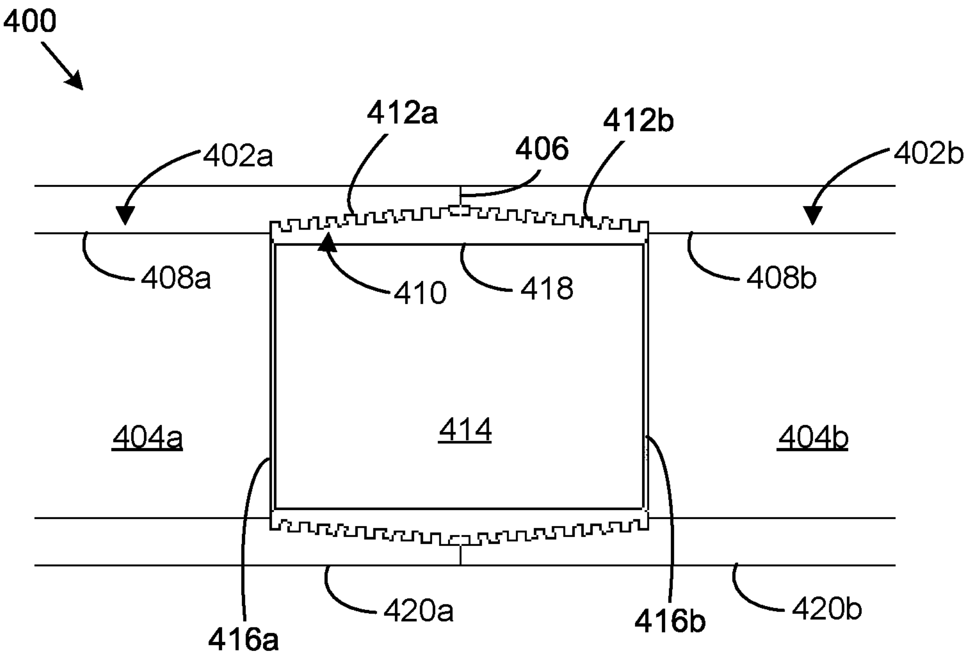
FIG. 4 is a cross-sectional, longitudinal view of a portion of an inner conductor of a coaxial transmission line, in accordance with at least one other embodiment.

Referring to FIG. 4, shown therein is a cross-sectional, longitudinal view of a portion of an inner conductor of a coaxial transmission line, in accordance with at least one other embodiment. Similar to inner conductor 300, the inner conductor 400 is formed of a plurality of sections 402*a*, 402*b* connected in end-to-end relation and are in physical contact at interface 406. Sections 402*a*, 402*b* are connected together by an inner connector 410. While only two sections of the inner conductor of a coaxial transmission line has been shown in FIG. 4, it is understood that the inner conductor can include more than two sections. Additional sections of the inner conductor can also be connected by additional inner connectors 310, 410.

Each of the sections 402*a*, 402*b* have an exterior lateral surface 420*a*, 420*b* and an interior lateral surface 408*a*, 408*b* defining bores 404*a*, 404*b*. Similar to inner connector 310, the interior lateral surface 418 extending from opposed ends 416*a*, 416*b* of the inner connector 410 defines a bore 414 along the longitudinal axis.

In contrast to that of inner conductor 300, the threaded portions 412*a*, 412*b* of the sections 402*a*, 402*b* are tapered. As such, the exterior lateral surface of the inner connector 410 is tapered at opposed ends 416*a*, 416*b* to engage with tapered threaded portions 412*a*, 412*b* of the sections 402*a*, 402*b*. As noted above, tapered threaded portions 412*a*, 412*b* require a higher axial tolerance to ensure physical contact than that of threaded portions 312*a*, 312*b* that are substantially parallel to the longitudinal axis of the inner conductor.

Figure 5:
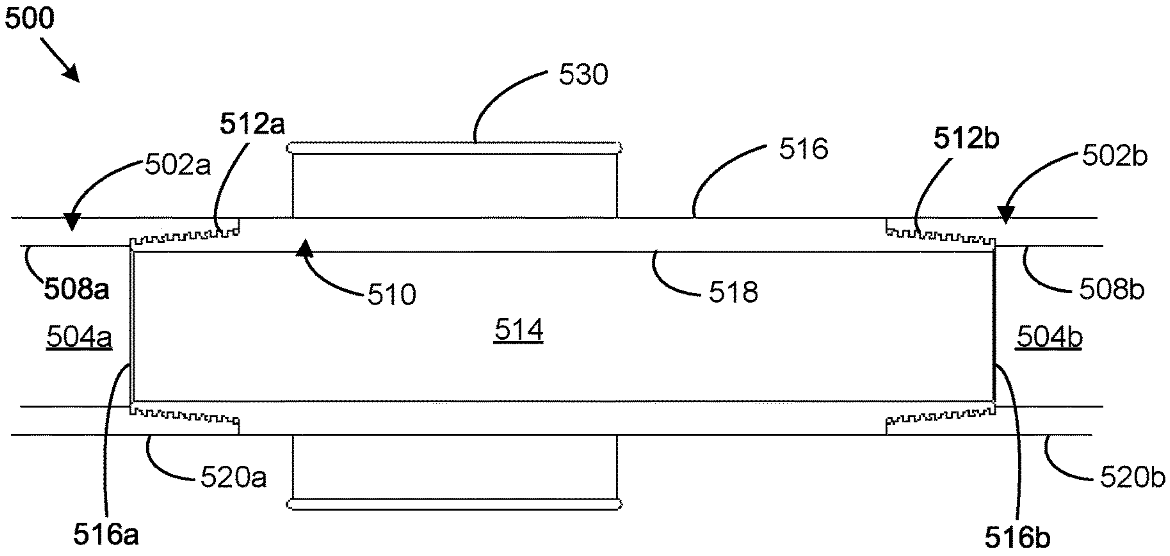
FIG. 5 is a cross-sectional, longitudinal view of a portion of an inner conductor of a coaxial transmission line with a centralizer, in accordance with at least one embodiment.

Referring now to FIG. 5, shown therein is a cross-sectional, longitudinal view of a portion of an inner conductor of a coaxial transmission line with a centralizer, in accordance with at least one embodiment. Similar to inner conductors 300 and 400, the inner conductor 500 is formed of a plurality of sections 502*a*, 502*b* connected in end-to-end relation. However, as shown in FIG. 5, sections 502*a*, 502*b* are not in physical contact with each other. Sections 502*a*, 502*b* are connected together by an inner connector 510. While only two sections of the inner conductor of a coaxial transmission line has been shown in FIG. 5, it is understood that the inner conductor can include more than two sections. Additional sections of the inner conductor can also be connected by additional inner connectors 310, 410, 510.

Each of the sections 502*a*, 502*b* have an exterior lateral surface 520*a*, 520*b* and an interior lateral surface 508*a*, 508*b* defining bores 504*a*, 504*b*. Similar to inner connectors 310, 410, the interior lateral surface 518 extending from opposed ends 516*a*, 516*b* of the inner connector 510 defines a bore 514 along the longitudinal axis.

Similar to that of inner conductor 400, the threaded portions 512*a*, 512*b* of the sections 502*a*, 502*b* are tapered. As such, the exterior lateral surface of the inner connector 510 is tapered at opposed ends 516*a*, 516*b* to engage with tapered threaded portions 512*a*, 512*b* of the sections 502*a*, 502*b*. While inner connector 510 is shown having tapered threaded portions, in some embodiments, inner connector 510 can have straight threaded portions, similar to FIG. 3.

Inner connector 510 has a middle portion 516 between threaded portions 512*a*, 512*b*. The exterior lateral surface along the middle portion 516 define an outer circumference with an outer diameter that is substantially uniform along the length of the middle portion 516. The outer diameter is substantially equal to the nominal outer diameter of the inner conductor. That is, the exterior lateral surface of the inner conductor 500 is provided by the exterior lateral surface 520*a*, 520*b* of the sections 502*a*, 502*b* and the middle portion 516 of the connector 510, which are substantially equal. Thus, the outer diameter of the inner conductor 500 is substantially uniform along the length of the coaxial transmission line, reducing field concentration effects, potential shorting, and changes in the characteristic impedance of the coaxial transmission line.

Since sections 502*a*, 502*b* are not in physical contact with each other, the inner connector 310 is formed of conductive material to provide an electrical connection between sections 502*a*, 502*b* of the inner conductor 500.

Inner connector 510 also has a centralizer 530 provided on the middle portion 516 for coaxially positioning the inner conductor within an outer conductor of the coaxial transmission line. Centralizer 530 can be any appropriate centralizer.

The centralizer 530 can be integral to the inner connector 510. That is, the centralizer 530 can be fixedly mounted thereon the inner connector 510. When the centralizer 530 is fixedly mounted on the inner connector 510, the step of sliding a centralizer along the exterior lateral surface of the inner conductors can be eliminated.

Centralizer 530 is shown in FIG. 5 as being offset along the middle portion 516, that is, closer to section 502*a* than to section 502*b* to provide a gripping surface for tools handling the inner connector 510. It is understood that centralizer 530 can be located at any appropriate location along the length of middle portion 516. While the inner connector 510 is shown having a centralizer 530 in FIG. 5, in some embodiments, inner connector 510 can have a middle portion 516 without a centralizer 530.

Figure 6:
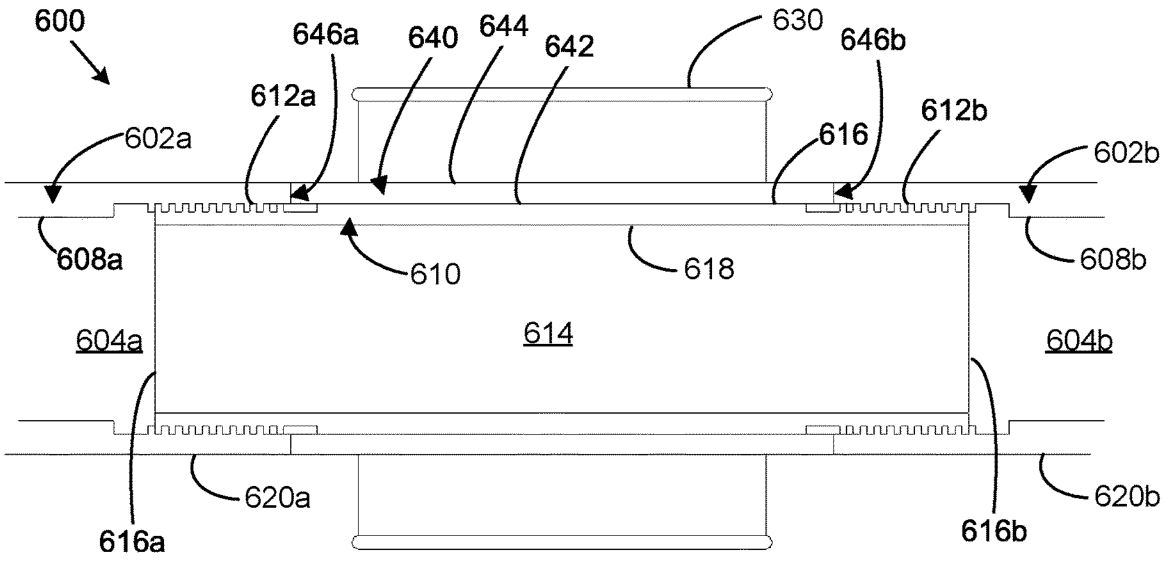
FIG. 6 is a cross-sectional, longitudinal view of a portion of an inner conductor of a coaxial transmission line with a centralizer, in accordance with at least one other embodiment.

Referring now to FIG. 6, shown therein is a cross-sectional, longitudinal view of a portion of an inner conductor of a coaxial transmission line with a centralizer, in accordance with at least one other embodiment. Similar to inner conductor 500, the inner conductor 600 is formed of a plurality of sections 602*a*, 602*b* connected in end-to-end relation but not in physical contact with each other. Sections 602*a*, 602*b* are connected together by an inner connector 610. While only two sections of the inner conductor of a coaxial transmission line have been shown in FIG. 6, it is understood that the inner conductor can include more than two sections. Additional sections of the inner conductor can also be connected by additional inner connectors 310, 410, 510, 610.

Each of the sections 602*a*, 602*b* have an exterior lateral surface 620*a*, 620*b* and an interior lateral surface 608*a*, 608*b* defining bores 604*a*, 604*b*. Similar to inner connectors 310, 410, 510, the interior lateral surface 618 extending from opposed ends 616*a*, 616*b* of the inner connector 610 defines a bore 614 along the longitudinal axis.

Similar to that of inner conductor 300, the threaded portions 612*a*, 612*b* of the sections 602*a*, 602*b* are substantially parallel to the longitudinal axis of the inner conductor 600. As such, the exterior lateral surface of the inner connector 610 is substantially parallel to the longitudinal axis at opposed ends 616*a*, 616*b* to engage with tapered threaded portions 612*a*, 612*b* of the sections 602*a*, 602*b*. While inner connector 610 is shown having straight threaded portions, in some embodiments, inner connector 610 can have tapered threaded portions, similar to FIGS. 4 and 5.

Inner connector 610 has a middle portion 616 between threaded portions 612*a*, 612*b*. The exterior lateral surface along the middle portion 616 define an outer circumference with an outer diameter that is substantially uniform along the length of the middle portion 616. As shown in FIG. 6, the outer diameter of the middle portion is less than the nominal outer diameter of the inner conductor.

Inner connector 610 also includes a ring member 640, which has a thickness defined by an internal lateral surface 642 and an external lateral surface 644. The internal lateral surface 642 can be slidably mounted on the middle portion 616 of the inner connector 610. That is, the internal lateral surface 642 can define a circumference with a diameter that is approximately the same as, or at least greater than the outer diameter of the middle portion 616 of the inner connector 610.

The external lateral surface 644 of the ring member 640 can define an outer circumference with an outer diameter that is substantially uniform along the length of the ring member. The exterior lateral surface of the inner conductor 600 is provided by the exterior lateral surface 620*a*, 620*b* of the sections 602*a*, 602*b* and the ring member 610 of the connector 610, which are substantially equal. Thus, the outer diameter of the inner conductor 600 is substantially uniform along the length of the coaxial transmission line, reducing field concentration effects, potential shorting, and changes in the characteristic impedance of the coaxial transmission line.

Ring member 640 has substantially planar shaped end faces that are substantially orthogonal to the longitudinal axis at interfaces 646*a* and 646*b*. Sections 602*a*, 602*b* are each in physical contact with ring member 640 at the interfaces 646*a*, 646*b*, respectively, to form an electrical connection. Since sections 602*a*, 602*b* are not in physical contact with each other, the ring member 640 is formed of conductive material to provide an electrical connection between sections 602*a*, 602*b* of the inner conductor 600.

In at least one embodiment, the inner connector 610 is also formed of conductive material to further provide an electrical connection between section 602*a*, 602*b* of the inner conductor 600. However, with the ring member 640 providing an electrical connection between sections 602*a*, 602*b*, in other embodiments, the inner connector 610 can be formed of a material having a hardness that is significantly greater than the hardness of the sections 602*a*, 602*b* to reduce the risk of galling and seizing when connected with the sections 602*a*, 602*b*. For example, similar to inner connectors 310, 410, the inner connector 610 can be formed of steel, particularly when the sections 602*a*, 602*b* are formed of aluminum.

Ring member 640 also has a centralizer 630 for coaxially positioning the inner conductor within an outer conductor of the coaxial transmission line. Centralizer 630 can be any appropriate centralizer. Centralizer 630 can be integral to the ring member 640. That is, the centralizer 630 can be fixedly mounted thereon the ring member 640. When the ring member 640 and centralizer 630 are slid onto the inner connector 610, the step of sliding a centralizer along the exterior lateral surface of the inner conductors can be eliminated. Centralizer 630 is shown in FIG. 6 as being centered along the length of the ring member 640. It is understood that centralizer 630 can be located at any appropriate location along the length of the ring member, such as with an offset as shown in FIG. 5.

Figure 7:
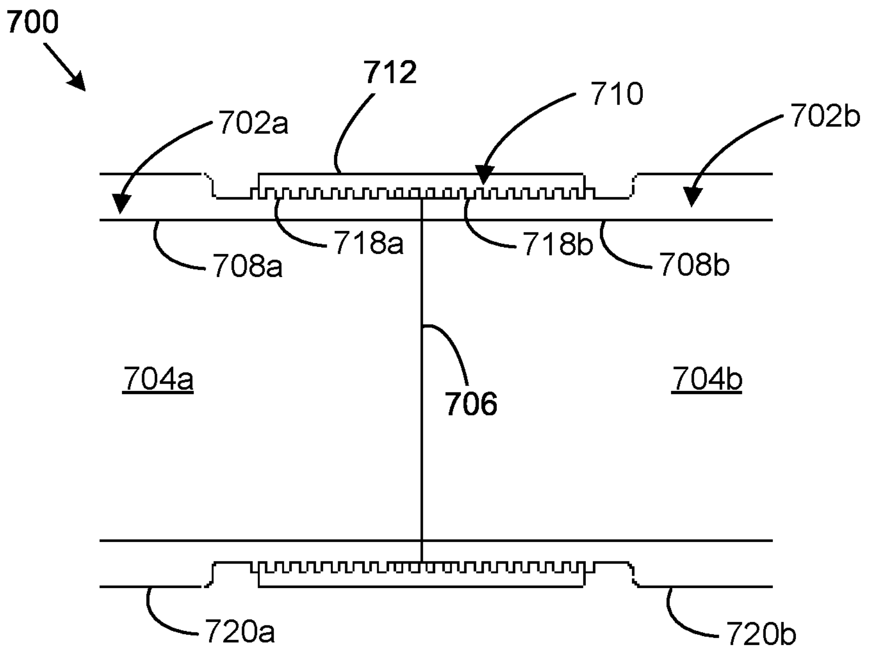
FIG. 7 is a cross-sectional, longitudinal view of a portion of an outer conductor of a coaxial transmission line, in accordance with at least one embodiment.

Referring now to FIG. 7, shown therein is a cross-sectional, longitudinal view of a portion of an outer conductor of a coaxial transmission line, in accordance with at least one embodiment. The outer conductor 700 is formed of a plurality of sections 702*a*, 702*b* connected in end-to-end relation. Two adjacent sections 702*a*, 702*b* are connected together by an outer coupling or an outer connector 710. While only two sections of the outer conductor of a coaxial transmission line has been shown in FIG. 7, it is understood that the outer conductor can include more than two sections. Additional sections of the outer conductor can also be connected by additional outer connectors 710.

In some embodiments, each of the sections 702*a*, 702*b* of the outer conductor 700 can be provided by a joint, that is, a length of tubing, such as tubing joint or a pup joint. Similar to sections 302*a*, 302*b*, the sections 702*a*, 702*b* have complementary shaped end faces to engage with other sections. As shown in FIG. 7, both sections 702*a*, 702*b* have substantially planar shaped end faces that are substantially orthogonal to the longitudinal axis at interface 706. Sections 702*a*, 702*b* are in physical contact with one another at the interface 706 to form an electrical connection. End faces with other geometries are possible. For example, the end faces can be angled with respect to the longitudinal axis and/or include groves and protrusions. Such geometries can increase the surface area of the interface 706 at which the end faces engage with one another, thereby reducing the electrical resistance of the sections 702*a*, 702*b*.

Each of the sections 702*a*, 702*b* have an exterior lateral surface 720*a*, 720*b* and an interior lateral surface 708*a*, 708*b* defining bores 704*a*, 704*b*. When the coaxial transmission line is assembled, an inner conductor, such as 160, 300, 400, 500, 600 is positioned in the bores 704*a*, 704*b* of the outer conductor 700, forming an annulus between the inner conductor and the outer conductor. The interior lateral surfaces 708*a*, 708*b* define an inner circumference with an inner diameter that is substantially uniform along the length of the sections 702*a*, 702*b*, or the nominal inner diameter.

As shown in FIG. 7, the interior lateral surface of the outer conductor 700 is provided by the interior lateral surfaces 708*a*, 708*b* of the sections, which are substantially equal. Thus, the inner diameter of the outer conductor 700 is substantially uniform along the length of the coaxial transmission line, reducing field concentration effects, potential shorting, changes in the characteristic impedance, and formation of reactances or wave reflections.

The exterior lateral surfaces 720*a*, 720*b* provide non-threaded portions and threaded portions 718*a*, 718*b*. The threaded portions 718*a*, 718*b* can engage with the outer connector 710. The non-threaded portions of the exterior lateral surfaces 720*a*, 720*b* define an outer circumference with an outer diameter that is substantially uniform along the length of the sections 702*a*, 702*b*, or the nominal outer diameter.

As shown in FIG. 7, the outer connector 710 has a tubular shape. The outer connector 710 extends between two opposed ends, defining a longitudinal axis. The outer connector 710 has an exterior lateral surface 712 and an interior lateral surface that extends between the two opposed ends.

The interior lateral surface of the outer connector 710 provides a first threaded portion and a second threaded portion. The first threaded portion of the outer connector 710 can engage with a complementary threaded portion 718*a* of a first section of the outer conductor 700, such as section 702*a* and the second threaded portion can engage with a complementary threaded portion 718*b* of a second section of the outer conductor 700, such as section 702*b*.

By providing an outer connector 710 to connect adjacent sections 702*a*, 702*b*, the nominal thickness of the sections 702*a*, 702*b* at the threaded portions do not need to be increased. In particular, the interior lateral surface at the threaded portions 718*a*, 718*b* do not protrude inwards and the outer diameter of the annulus 152 can be substantially uniform along the length of the coaxial transmission line 150.

The outer diameter of the outer conductor 700 is substantially equal to the nominal outer diameter of the sections 702*a*, 702*b* to provide an outer conductor 700 with a substantially uniform outer diameter along the length of the outer conductor 700, which facilitates deployment of the coaxial transmission line, particularly the outer conductor 700. In such embodiments, the threaded portions 718*a*, 718*b* of the sections 702*a*, 702*b* are recessed from the non-threaded portions of the sections 702*a*, 702*b*. In particular, the depth of the recess corresponds to the thickness of the outer connector 710 to ensure that the exterior lateral surface 712 of the outer connector 710 aligns with the exterior lateral surfaces 720*a*, 720*b* of the sections 702*a*, 702*b*.

Similar to sections 302*a*, 302*b*, sections 702*a*, 702*b* can be made of any appropriate conductive material, including but not limited to aluminum, copper, various conductive alloys, or it can be made of other metals cladded with conductive material.

Similar to inner connector 310, the outer connector 710 can be made of a material having a hardness that is significantly greater than the hardness of the sections 702*a*, 702*b* to reduce the risk of galling and seizing with the sections 702*a*, 702*b*. For example, the outer connector 710 can be formed of steel, particularly when the sections 702*a*, 702*b* are formed of aluminum.

In addition, the outer connector 710 is formed of conductive material to provide a reliable electrical connection between the first section and the second section of the outer conductor 700.

Similar to the sections 302*a*, 302*b*, and the inner connector 310, the threaded portions 718*a*, 718*b* of the sections 702*a*, 702*b* and the outer connector 710 are substantially parallel to the longitudinal axis of the outer conductor 700. Threading that is substantially parallel to the longitudinal axis of the outer conductor 700 requires less axial tolerance to ensure physical contact at interface 706 than that required for tapered threaded portions 212, 262*a*, 262*b* and can provide a more reliable electrical connection.

In some embodiments, the interior lateral surface of the outer connector 710, that is, the threaded portion can be hardened to reduce the risk of galling and seizing. As noted above, hardening can be provided by a heat treatment, a hard coating, or a material having a hardness that is greater than a hardness of a material forming the threaded portions 718*a*, 718*b* of the sections 702*a*, 702*b*.

Similar to the inner connector 310, in some embodiments, the outer connector 710 and/or the sections 702*a*, 702*b* can include a non-magnetic liner to reduce eddy current losses on the sections 702*a*, 702*b*. The non-magnetic liner can be located on the interior lateral surface of the inner connector 710, the interior lateral surface 708*a*, 708*b* of the sections 702*a*, 702*b*, and/or the threaded portions 718*a*, 718*b* of the sections 702*a*, 702*b*.

Similar to the complementary threaded portions 312*a*, 312*b* of the sections 302*a*, 302*b*, the complementary threaded portions 718*a*, 718*b* of the sections 702*a*, 702*b* and the outer connector 710 can be any engagement means to attach or mount the sections 702*a*, 702*b* to the outer connector. For example, when threading is provided, the threading can be stub ACME threads, API round threads, or any other form of threading. Other engagement means for attaching sections to a connector are possible.

Figure 8:
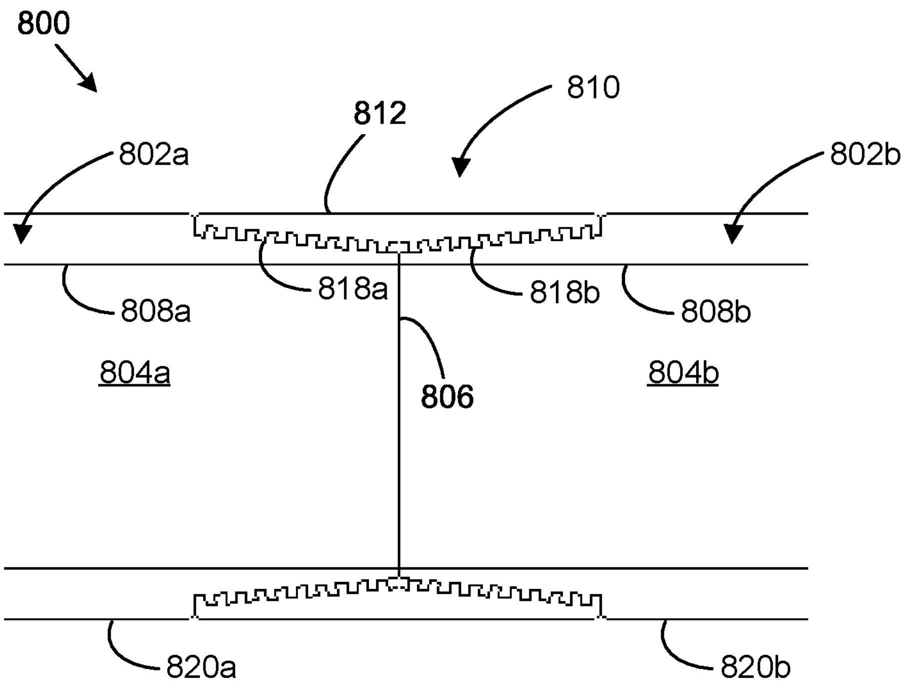
FIG. 8 is a cross-sectional, longitudinal view of a portion of an outer conductor of a coaxial transmission line, in accordance with at least one other embodiment.

Referring to FIG. 8, shown therein is a cross-sectional, longitudinal view of a portion of an outer conductor of a coaxial transmission line, in accordance with at least one other embodiment. Similar to outer conductor 700, the outer conductor 800 is formed of a plurality of sections 802*a*, 802*b* connected in end-to-end relation. Sections 802*a*, 802*b* are connected together by an outer connector 810. While only two sections of the outer conductor of a coaxial transmission line has been shown in FIG. 8, it is understood that the outer conductor can include more than two sections. Additional sections of the outer conductor can also be connected by additional outer connectors 710, 810.

Each of the sections 802*a*, 802*b* have an exterior lateral surface 820*a*, 820*b* and an interior lateral surface 808*a*, 808*b* defining bores 804*a*, 804*b*. Similar to outer connector 710, the exterior lateral surface 812 extends between the two opposed ends of the inner connector 810.

In contrast to that of outer conductor 700, the threaded portions 818*a*, 818*b* of the sections 802*a*, 802*b* are tapered. As such, the interior lateral surface of the connector 810 is tapered at opposed ends to engage with tapered threaded portions 818*a*, 818*b* of the sections 802*a*, 802*b*. As noted above, tapered threaded portions 818*a*, 818*b* require a higher axial tolerance to ensure physical contact at interface 806 than that of threaded portions 718*a*, 718*b* that are substantially parallel to the longitudinal axis of the outer conductor.

Figure 9:
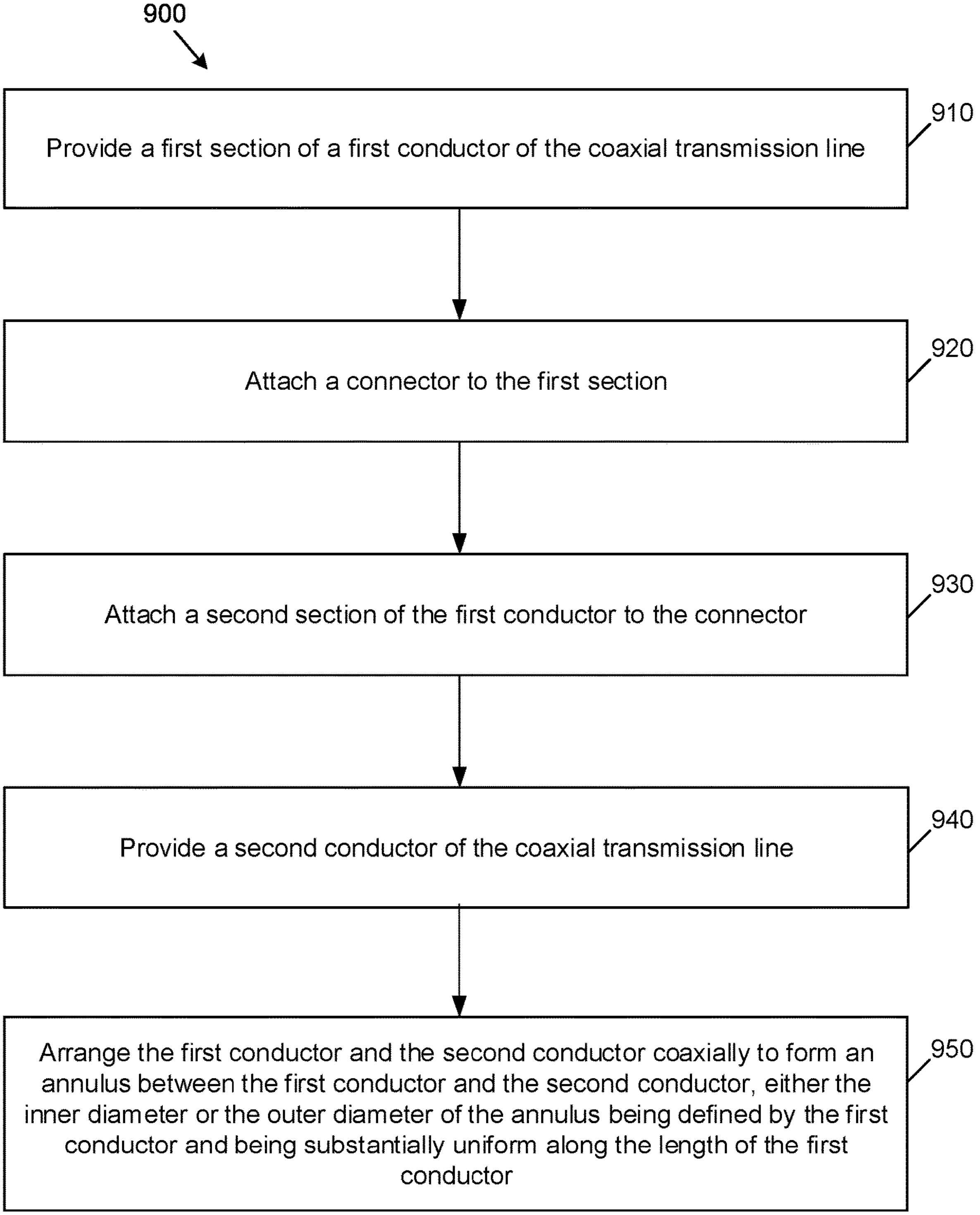
FIG. 9 is a flowchart diagram of an example method of providing a coaxial transmission line in accordance with at least one embodiment.

Referring now to FIG. 9, shown therein is a flowchart diagram of an example method 900 of providing a coaxial transmission line 150 in accordance with at least one embodiment.

At 910, a first section 302*a*, 402*a*, 502*a*, 602*a*, 702*a*, 802*a* of a first conductor of the coaxial transmission line is provided. The first section 302*a*, 402*a*, 502*a*, 602*a*, 702*a*, 802*a* has a first threaded portion 312*a*, 412*a*, 518*a*, 618*a*, 718*a*, 818*a* at a first end.

At 920, a connector 310, 410, 510, 610, 710, 810 is attached to the first section 302*a*, 402*a*, 502*a*, 602*a*, 702*a*, 802*a* at the first threaded portion 312*a*, 412*a*, 518*a*, 618*a*, 718*a*, 818*a*. When the first conductor is an inner conductor, the connector is an inner connector 310, 410, 510, 610; when the first conductor is an outer conductor, the connector is an outer connector 710, 810. The connector 310, 410, 510, 610, 710, 810 has a lateral surface extending between two opposed ends. The lateral surface has a third threaded portion at a first of the two opposed ends and a fourth threaded portion at a second of the two opposed ends. When the connector is an inner connector 310, 410, 510, 610, the threaded portions are provided on the interior lateral surface of the inner connector 310, 410, 510, 610. When the connector is an outer connector 710, 810, the threaded portions are provided on the exterior lateral surface of the outer connector 710, 810. The third threaded portion of the connector 310, 410, 510, 610 engages with the first threaded portion 312*a*, 412*a*, 518*a*, 618*a*, 718*a*, 818*a* of the first section.

At 930, a second section 302*b*, 402*b*, 502*b*, 602*b*, 702*b*, 802*b* of a first conductor of the coaxial transmission line is connected to the connector 310, 410, 510, 610, 710, 810 at the fourth threaded portion of the connector 310, 410. The second section 302*b*, 402*b*, 502*b*, 602*b*, 702*b*, 802*b* has a second threaded portion at a first end that engages with the fourth threaded portion of the connector 310, 410, 510, 610. Acts 910, 920, and 930 are repeated with additional sections to form a conductor having a desired length.

At 940, a second conductor of the coaxial transmission line is provided. The second conductor can be any appropriate conductor, including but not limited to coiled tubing or a conductor formed of a plurality of sections connected in end-to-end relation, in accordance with embodiments disclosed herein.

At 950, the first conductor and the second conductor can be arranged coaxially to form an annulus 152 between the first conductor and the second conductor, 160, 170. The annulus 152 has an inner diameter defined by the exterior lateral surface 164 of the inner conductor 160 and an outer diameter defined by the interior lateral surface 172 of the outer conductor 170. When the first conductor provides the inner conductor 160, the exterior lateral surface 320*a*, 320*b*, 420*a*, 420*b*, 520*a*, 520*b*, 620*a*, 620*b* of the inner conductor 300, 400, 500, 600 defines an inner diameter of the annulus 152 that is substantially uniform along the length of the first conductor. When the first conductor provides the outer conductor 170, the interior lateral surface 708*a*, 708*b*, 808*a*, 808*b* of the outer conductor 700, 800 defines an outer diameter of the annulus 152 that is substantially uniform along the length of the first conductor.

In some embodiments, the method can further involve hardening either the lateral surface of the connector or the first threaded portion of the first section prior to attaching the connector to the first section at 920.

When the coaxial transmission line 150 is provided for electromagnetic heating of hydrocarbon formations, the first conductor can be deployed on the rig floor of conventional wells. That is, the first section and the second section of the first conductor 300, 400, 500, 600, 700, 800 can be attached together, via the connector 310, 410, 510, 610, 710, 810, on the rig floor as it is run in the well bore. Tubing tongs are typically used to make up the joint, that is, to connect joints 202*a*, 202*b* together. Connecting sections 302*a*, 302*b*, 402*a*, 402*b*, 502*a*, 502*b*, 602*a*, 602*b*, 702*a*, 702*b*, 802*a*, 802*b* with the connector 310, 410, 510, 610, 710, 810 involves a minor additional step which is not anticipated to take a significant amount of time because the tubing tongs are already in place. If back-up jaws on the tubing tongs are spaced to span the length of the connector 310, 410, 510, 610, 710, 810 and grip the two adjacent sections, each section can be preassembled with a connector, and there will be no difference between making up sections 302*a*, 302*b*, 402*a*, 402*b*, 502*a*, 502*b*, 602*a*, 602*b*, 702*a*, 702*b*, 802*a*, 802*b* with the connectors 310, 410, 510, 610, 710, 810 and the conventional method of making up joints 202*a*, 202*b*.

Furthermore, when each of the inner conductor 160 and the outer conductor 170 of a coaxial transmission line 150 are provided in accordance with various embodiments described herein for electromagnetic heating of hydrocarbon formations, the method can involve deploying the outer conductor 170 followed by deploying the inner conductor. That is, connecting sections 702, 702*b*, 802*a*, 802*b* of the outer conductor 170 together on the rig floor and running the outer conductor 160 in the well bore, followed by connecting sections 302*a*, 302*b*, 402*a*, 402*b*, 502*a*, 502*b*, 602*a*, 602*b* of the inner conductor 160 together on the rig floor and running the inner conductor 160 inside the outer conductor 170, which already in the well bore.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An apparatus for a coaxial transmission line, the apparatus comprising:

i. a first section of an inner conductor of the coaxial transmission line having a length, an exterior lateral surface and an interior lateral surface, the first section being formed of a conductive material, the exterior lateral surface defining a substantially uniform first outer diameter along the length of the first section, the interior lateral surface having a first mating portion located at a first end of the first section;

ii. at least a second section of the inner conductor having a length, an exterior lateral surface and an interior lateral surface, the second section being formed of a conductive material, the exterior lateral surface defining a substantially uniform second outer diameter along the length of the second section, the second outer diameter being substantially equal to the first outer diameter, the interior lateral surface having a second mating portion located at a second end of the second section; and iii. at least one connector for connecting the first section and the second section in end-to-end relation, the connector having an exterior lateral surface extending between two opposed ends, the exterior lateral surface having a third mating portion at a first of the two opposed ends and a fourth mating portion at a second of the two opposed ends, the third mating portion being complementary to the first mating portion of the first section, the fourth mating portion being complementary to the second mating portion of the second section.

2. The apparatus of claim 1, wherein the exterior lateral surface of the connector is hardened.

3. The apparatus of claim 1, wherein the exterior lateral surface of the connector is formed of a material that comprises at least one selected from a group consisting of: beryllium, rhodium, ruthenium, copper, aluminum, and silver.

4. The apparatus of claim 1, wherein the exterior lateral surface of the connector is formed of a material having a hardness that is greater than a hardness of a material forming the first mating portion and the second mating portion.

5. The apparatus of claim 1, wherein the first section of the inner conductor and the second section of the inner conductor comprise cladding on the exterior lateral surfaces.

6. The apparatus of claim 5, wherein the cladding on the first section and the second section is formed of a material comprising copper.

7. The apparatus of claim 5, wherein:

the connector further comprises a middle portion between the third mating portion and the fourth mating portion, the middle portion having a length, the exterior lateral surface along the length of the middle portion defining a substantially uniform third outer diameter; and each end of the cladding on the first section and the second section is extended to contact the exterior lateral surface of the middle portion of the connector.

8. The apparatus of claim 7, wherein:

each end of the cladding on the first section and the second section extends inwardly; and the middle portion comprises tapered portions to accommodate the inwardly extending ends of the cladding on the first section and the second section.

9. The apparatus of claim 1, wherein the connector comprises a non-magnetic liner located on the exterior lateral surface of the connector to reduce eddy current losses.

10. The apparatus of claim 1, wherein each of the first section and the second section comprises a non-magnetic liner to reduce eddy current losses, the non-magnetic liners being located on at least one of:

the first mating portion of the first section and the second mating portion of the second section; or the exterior lateral surface of the first section and the exterior lateral surface of the second section.

11. The apparatus of claim 10, wherein the non-magnetic liner is formed of a material comprising at least one selected from a group consisting of: aluminum, bronze, stainless steel, brass, copper, silver, non-magnetic metals, and alloys.

12. The apparatus of claim 1, wherein the first mating portion and the third mating portion comprise threading.

13. The apparatus of claim 1, wherein the second mating portion and the fourth mating portion comprise threading.

14. An apparatus for a coaxial transmission line, the apparatus comprising:

i. a first section of an outer conductor of the coaxial transmission line having a length, an exterior lateral surface and an interior lateral surface, the first section being formed of a conductive material, the interior lateral surface defining a substantially uniform first inner diameter along the length of the first section, the exterior lateral surface having a first mating portion and a first non-mating portion, the first non-mating portion having a length, the first non-mating portion defining a substantially uniform first outer diameter along the length of the first non-mating portion, the first mating portion being located at a first end of the first section and recessed from the first non-mating portion;

ii. at least a second section of the outer conductor having a length, an exterior lateral surface and an interior lateral surface, the second section being formed of a conductive material, the interior lateral surface defining a substantially uniform second inner diameter along the length of the second section, the second inner diameter being substantially equal to the first inner diameter, the exterior lateral surface having a second mating portion and a second non-mating portion, the second non-mating portion having a length, the second non-mating portion defines a substantially uniform second outer diameter along the length of the second non-mating portion, the second outer diameter being substantially equal to the first outer diameter, the second mating portion being located at a second end of the second section and recessed from the second non-mating portion; and iii. at least one connector for connecting the first section and the second section in end-to-end relation, the connector having an interior lateral surface extending from a first end and a second end opposed to the first end, the interior lateral surface having a third mating portion at the first end of the connector and a fourth mating portion at the second end of the connector, the third mating portion being complementary to the first mating portion of the first section, the fourth mating portion being complementary to the second mating portion of the second section, the connector having an exterior lateral surface defining a connector outer diameter that is substantially equal to or less than the first outer diameter.

15. The apparatus of claim 14, wherein the interior lateral surface of the connector comprises a hard coating.

16. The apparatus of claim 14, wherein the interior lateral surface of the connector is formed of a material that has a hardness that is greater than a hardness of a material forming the first mating portion and the second mating portion.

17. The apparatus of claim 14, wherein the first section of the outer conductor and the second section of the outer conductor comprise cladding on the interior lateral surfaces.

18. The apparatus of claim 17, wherein the cladding on the first section and the second section is formed of a material comprising copper.

19. The apparatus of claim 14, wherein each of the first end of the first section and the second end of the second section comprise an angled end face with respect to a longitudinal axis of that section.

20. The apparatus of claim 14, wherein the connector comprises a non-magnetic liner located on the interior lateral surface of the connector to reduce eddy current losses.

21. The apparatus of claim 20, wherein the non-magnetic liner is formed of a material comprising at least one selected from a group consisting of: aluminum, bronze, stainless steel, brass, copper, silver, non-magnetic metals, and alloys.

22. The apparatus of claim 14, wherein each of the first section and the second section comprises a non-magnetic liner to reduce eddy current losses, the non-magnetic liners being located on at least one of:

the first mating portion of the first section and the second mating portion of the second section; or the interior lateral surface of the first section and the interior lateral surface of the second section.

23. The apparatus of claim 14, wherein the first mating portion and the third mating portion comprise threading.

24. The apparatus of claim 14, wherein the second mating portion and the fourth mating portion comprise threading.

* * * * *